United States Patent
Hanzawa et al.

[11] Patent Number: 5,840,436
[45] Date of Patent: Nov. 24, 1998

[54] SPALLING-RESISTANT, CREEP-RESISTANT AND OXIDATION-RESISTANT SETTERS

[75] Inventors: Shigeru Hanzawa, Kagamihara; Tsuneo Komiyama, Toki, both of Japan

[73] Assignee: NGK Insulators, Ltd., Nagoya, Japan

[21] Appl. No.: 734,126

[22] Filed: Oct. 21, 1996

Related U.S. Application Data

[63] Continuation of Ser. No. 193,108, Feb. 8, 1994, abandoned.

[30] Foreign Application Priority Data

| Jun. 8, 1992 | [JP] | Japan | 4-147435 |
| Jun. 25, 1992 | [JP] | Japan | 4-167526 |
| Sep. 7, 1992 | [JP] | Japan | 4-238457 |

[51] Int. Cl.$^6$ ............................................. B32B 17/00
[52] U.S. Cl. ..................... 428/698; 428/134; 428/136; 432/251; 432/253; 432/258; 264/57; 264/58
[58] Field of Search ............................. 501/87, 88, 89; 432/251, 253, 258, 259; 264/57, 58; 428/688, 698, 134, 136

[56] References Cited

U.S. PATENT DOCUMENTS

| 3,275,722 | 9/1966 | Popper | 246/65 |
| 3,998,646 | 12/1976 | Weaver | 106/44 |
| 4,174,950 | 11/1979 | Jalbert | 432/6 |
| 4,240,835 | 12/1980 | Laskow | 106/44 |
| 4,354,991 | 10/1982 | Suzuki et al. | 264/65 |
| 4,467,043 | 8/1984 | Kriegesmann | 501/88 |
| 4,564,490 | 1/1986 | Omori | 264/65 |
| 4,598,024 | 7/1986 | Stinton | 428/448 |
| 4,795,673 | 1/1989 | Frechette | 428/331 |
| 4,874,725 | 10/1989 | Furukawa | 501/89 |
| 5,019,430 | 5/1991 | Higgins | 427/430.1 |
| 5,205,970 | 4/1993 | Brun | 264/60 |
| 5,338,576 | 8/1994 | Hanzawa | 427/430.1 |

FOREIGN PATENT DOCUMENTS

| 50-35094 | 10/1975 | Japan . |
| 61-143686 | 7/1986 | Japan . |
| 1 394 106 | 5/1975 | United Kingdom . |

OTHER PUBLICATIONS

Patent Abstracts of Japan, JP 4–225787A, vol. 16, No. 578, Dec. 17. 1992, "Shelf Plate Made of Refractory".
Derwent Abstract No. 93–365016/46, Mar. 25, 1992.
Derwent Abstract No. 88–024342/04, May 31, 1986.
Derwent Abstract No. 86–209704/32, Dec. 18, 1984.

*Primary Examiner*—Timothy Speer
*Attorney, Agent, or Firm*—Kubovcik & Kubovcik

[57] ABSTRACT

A rectangular spalling-resistant refractory setter for use in heating furnace, which is made of a material having a bending strength of 1,000 kgf/cm$^2$ or higher at 1,000–1,300° C. and which has slits extending from each of at least one pair of the parallel sides of the setter toward the opposite side in a length of 15–35% based on the length of each side which is parallel to the slit.

A creep-resistant setter which is made of a Si—SiC sintered material containing controlled amounts of impurities and having a controlled porosity.

An oxidation-resistant setter which is made of a Si—SiC sintered material containing controlled amounts of impurities and having a controlled porosity.

These setters are superior in spalling resistance, creep resistance and oxidation resistance, can mount thereon an increased amount of materials to be fired, and give a higher firing efficiency.

8 Claims, 2 Drawing Sheets

SPALLING-RESISTANT, CREEP-RESISTANT AND OXIDATION-RESISTANT SETTERS

This application is a continuation of application Ser. No. 08/193,108 filed Feb. 8, 1994, now abandoned, which is a 371 of JPCT/JP93/00759 filed Jun. 7, 1993.

TECHNICAL FIELD

The present invention relates to refractory setters superior in spalling resistance, creep resistance and oxidation resistance, which can be preferably used in firing of ceramics, tiles, etc.

BACKGROUND ART

In the firing of ceramics (e.g. insulators, sanitation fixtures, tableware, picture frames and earthenware pipes), tiles, etc., there have been used refractory setters having slits extending from the peripheries [Japanese Utility Model Application Kokai (Laid-Open) No. 46044/1974] and refractory setters having said slits filled with a filler (Japanese Utility Model No. 33974/1979).

These refractory setters are found to have an advantage of being resistant to thermal spalling and mechanical spalling even when used under severe conditions such as an hourly temperature increase rate exceeding 400° C. In these refractory setters, a larger strength, particularly a larger bending strength is preferable because such a larger strength can increase the amount mounted on the setter, of the material to be fired and can give a higher firing efficiency and a lower cost. In the actual firing using such a setter having a larger bending strength, however, the setter smashes with a big noise after the lapse of a certain length of time; that is, a smashing phenomenon occurred.

Hence, an object of the present invention is to provide a setter which has a large bending strength so as to enable loading of an increased amount of a material to be fired and yet has an excellent spalling resistance to avoid smashing.

As the material for a setter, SiC sintered materials are in wide use. These SiC sintered materials include a Si—SiC sintered material containing SiC and Si as constituents, but there has been no case of using this Si—SiC sintered material as a material for setter. Further, in the actual firing using a setter made of said Si—SiC sintered material, the setter gave warpage and was found to be unusable when used in the firing of tableware, tiles, etc. because the firing temperature was as high as 1,200°–1,350° C. although the setter received a small weight; and the setter gave weight-induced deformation when used in the firing of sanitation fixtures, roofing tiles, bricks, etc. because the setter received a large weight although the firing temperature was relatively low (1,100°–1,200° C.).

Hence, another object of the present invention is to provide a Si—SiC setter of excellent creep resistance which enables loading of a larger amount of a material to be fired and yet gives no warpage even when used repeatedly for a long period of time.

Also, a setter made of a Si—SiC sintered material, when used in the firing of tableware, sanitation fixtures, etc., was oxidized and became fragile, generated cracks, was broken in the worst case, and was unusable.

Hence, still another object of the present invention is to provide a Si—SiC setter of excellent oxidation resistance which can be used for a long period of time, as well as a process for production of said setter.

DISCLOSURE OF THE INVENTION

According to the first aspect of the present invention, there is provided a rectangular spalling-resistant refractory setter for use in a heating furnace, characterized by being made of a material having a bending strength of a given value or higher and further by having at least one slit of a given length extending from each of at least one pair of the two parallel sides of the setter toward the opposite side.

According to the second aspect of the present invention, there is provided a creep-resistant Si—SiC setter characterized by containing, as the main phase, 2–25% by weight of Si and 75–98% by weight of SiC, and an Al impurity in a controlled amount of 0.2 part by weight or less per 100 parts by weight of said main phase.

According to the third aspect of the present invention, there is provided an oxidation-resistant Si—SiC setter characterized by containing, as the main phase, 3–30% by weight of Si and 70–97% by weight of SiC, by having a controlled porosity of 0.8% or lower, and by containing at least one impurity selected from the group consisting of Ca, Al and Fe in a controlled amount of 0.8 part by weight or less per 100 part by weight of the main phase.

In the first setter of the present invention, the bending strength is preferably 1,000 kgf/cm$^2$ or higher at high temperatures of 1,000–1,300° C. and the length of each slit is preferably 15–35% of the length of each setter side which is better to parallel to the slit.

The first setter of the present invention is made of a material having a bending strength of a given value or higher and has slits of a given length.

This setter is superior particularly in spalling resistance and, when used in the firing of ceramics, tiles, etc. in a heating furnace, causes no smashing phenomenon and gives no damage to the material to be fired. It is therefore used as a preferable setter in a heating furnace.

In order to increase the amount mounted of the material to be fired (e.g. ceramic) and achieve a higher firing efficiency, the first setter is made of a material having a bending strength of a given value or higher, preferably 1,000 kgf/cm$^2$ or higher at high temperatures of 1,000°–1,300° C.

As the material for the first setter, there can be preferably used a Si—SiC sintered material containing SiC and Si as constituents, a recrystallized SiC sintered material, a Si$_3$N$_4$ sintered material, etc. because each of them has a high strength.

In the first setter having a high strength, slits of a given length are formed so as to extend from each of at least one pair of two parallel setter sides toward the opposite side. The length of each slit is preferably 15–35%, particularly preferably 20–30% of the length of each setter side which is parallel to the slit. When the slit length is within the above range, no smashing phenomenon occurs and setter breakage can be minimized. When the slit length exceeds 35% of the length of each setter side which is parallel to the slit, such a setter has a low strength, making its handling difficult and inconvenient.

Further, the slits are preferably formed so that the slit(s) extending from one setter side and the slit(s) extending from the opposite side are in a point symmetry as shown in FIGS. 1–4, because the resulting setter can have uniform spalling resistance in all portions.

Next, description is made on an example of a process for production of each of a Si—SiC sintered material, a recrystallized SiC sintered material and a Si$_3$N$_4$ sintered material, which are all a high-strength material used in the present invention.

A Si—SiC sintered material can be produced by mixing SiC particles with a carbon fine powder and an organic binder, molding the mixture by press molding, cast molding, extrusion or the like, and impregnating the molded material with metallic Si in a reduced inert gas atmosphere or in vacuum. A recrystallized SiC sintered material can be produced by mixing SiC particles with an organic binder, molding the mixture, and firing the molded material in an inert gas atmosphere. A $Si_3N_4$ sintered material can be produced by mixing a $Si_3N_4$ powder with a sintering additive, molding the mixture, and firing the molded material in a nitrogen atmosphere.

As to the molding method to obtain a molded material, press molding is preferable because slits can be formed simultaneously and mass productivity is high. In the press molding, an oil hydraulic press is preferred and a pressure of 50–2,000 $kgf/cm^2$ is used ordinarily.

Description is then made on the second setter of the present invention.

In the second setter, the amount of Al impurity is controlled at an appropriate level, based on a finding that the impurities such as Al and others, contained in the SiC, carbon, silicon, etc. used as starting materials in production of a Si—SiC sintered material constituting the second setter reduce the creep resistance of the setter.

In the second setter of the present invention, the amount of Al impurity is controlled at 0.2 part by weight or less, preferably 0.1 part by weight or less per 100 parts by weight of the main phase composed of 2–25% by weight of Si and 75–98% by weight of SiC. When the amount is more than 0.2 part by weight, the resulting setter has a reduced creep resistance.

Other impurities contained in the second setter in a controlled amount, can be exemplified by Fe, Ti, Ca, Mg, Cr and Ni. The desirable amount of these impurities is 0.05–1 part by weight, preferably 0.05–0.5 part by weight per 100 parts by weight of the main phase. When the amount is less than 0.05 part by weight, the resulting setter has a reduced oxidation resistance. When the amount is more than 1 part by weight, the setter has a reduced creep resistance and some setter components may migrate into a material to be fired, mounted on the setter.

The amount of $SiO_2$ as another impurity should also be controlled. The amount is preferably controlled at 3.0 parts by weight or less per 100 parts by weight of the main phase. When the amount is more than 3.0 parts by weight, the resulting setter has a reduced creep resistance.

The process for producing the Si—SiC sintered material constituting the second setter is similar to that for the first setter. The amounts of impurities such as Al, Fe, Ti and the like in the sintered material can be controlled by appropriately selecting the starting materials for sintered material, such as SiC, metallic Si and the like. That is, by appropriately selecting the starting materials containing given amounts of said impurities, the resulting Si—SiC sintered material can contain impurities in controlled amounts. Small adjustment of these impurity amounts is possible by adequate addition or removal of the impurities.

In the second setter, slits are not essential. The second setter can exhibit sufficient creep resistance without having any slit. Alternatively, the second setter may have the same slits as specified in the first setter, for higher spalling resistance.

Then, the third setter is described.

In the third setter, the Si—SiC sintered material constituting said setter has a controlled porosity and contains impurities such as Ca, Al, Fe and the like in a controlled amount.

That is, the porosity of the Si—SiC sintered material is controlled at 0.8% or lower in order to allow the third setter to have a smaller area for contact with oxygen gas during service; further, the amount in the sintered material, of at least one impurity selected from the group consisting of Ca, Fe and Al is kept at 0.8 part by weight or less per 100 parts by weight of the main phase of the sintered material, consisting of 3–30% by weight of Si and 70–97% by weight of SiC, in order to control the amounts of the elements such as Ca and the like which promote the oxidation of the sintered material. Thus, the third setter has a high oxidation resistance.

The process for producing the Si—SiC sintered material constituting the third setter, is described in detail.

For molding, a molding material is used which is a mixture of 1–12% by weight of a C powder, 88–99% by weight of a SiC powder, 0.1–15 parts by weight, per 100 parts by weight of the total of the C powder and the SiC powder, of an organic binder, and an appropriate amount of water or an organic solvent. This molding material is kneaded and molded. The molded material, as in the cases of the first and second setters, is placed in an inert gas of reduced pressure or in vacuum in a metallic Si atmosphere to impregnate the molded material with metallic Si, whereby a Si—SiC sintered material is produced.

In the preparation of the molded material, the total amount of Ca, Al and Fe impurities contained in the C powder, the SiC powder and the metallic Si used in impregnation is controlled at 0.8 part by weight or less per 100 parts by weight of the sintered material to be obtained. When the amount is more than 0.8 part by weight, the sintered material tends to have a low oxidation resistance. This control of impurities amount can be achieved by, as mentioned previously, the appropriate selection of the C powder, the SiC powder, etc. or the adequate addition or removal of the impurities for small adjustment.

The impregnation with metallic Si is conducted so that the resulting Si—SiC sintered material has a porosity of 0.8% or lower. At this time, it is necessary that the metallic Si be added in an excess of the theoretical amount required for achievement of a porosity of 0.8%, in view of the impregnation efficiency, etc. In order to achieve a porosity of 0.8%, it is necessary to add metallic Si in an amount of at least 1.05 times said theoretical amount. The metallic Si added is consumed in three forms, i.e. a portion contributing to a reaction (Si+C→SiC), a portion filling the pores, and an excessive Si portion. When the metallic Si is added in an amount of less than 1.05 times, the impregnation with Si is insufficient and the resulting sintered material has an increased porosity and has a reduced oxidation resistance.

The addition of excessive metallic Si results in the oozing-out of excessive Si portion on the surface of the sintered material. The Si portion which has oozed out, however, can be removed by sandblasting, lathing or the like.

As a result of the above impregnation with metallic Si, the Si—SiC sintered material contains a main phase composed of 3–20% by weight of Si and 70–97% by weight of sic.

The method for molding to obtain a molded material is the same as in the case of the first setter.

In the third setter, slits are not essential. The third setter can exhibit sufficient oxidation resistance without having any slit. Alternatively, the third setter may have the same slits as specified in the first setter, for higher spalling resistance.

BEST MODE FOR CARRYING OUT THE INVENTION

The present invention is hereinafter described in more detail by way of Examples. However, the present invention is not restricted to these Examples.

(Test method for spalling resistance $\Delta T$)

On a sintered material was mounted an aluminum brick having a thickness of 20 mm and a bottom area which was half of the surface area of the sintered material, in a furnace of a given temperature $T_2$. The sintered material was taken out from the furnace into air of a temperature $T_1$. When the sintered material generated cracks or caused smashing in the air, the temperature difference $\Delta T$ ($=T_2-T_1$) was taken as the spalling resistance of the sintered material.

(Test method for oxidation resistance $\Delta W$)

A sintered material was placed in a gas ($H_2+O_2$) at 1,050° C. for 100 hours, and the resulting weight increase $\Delta W$ of the sintered material was measured.

(Example 1)

Figure 1:
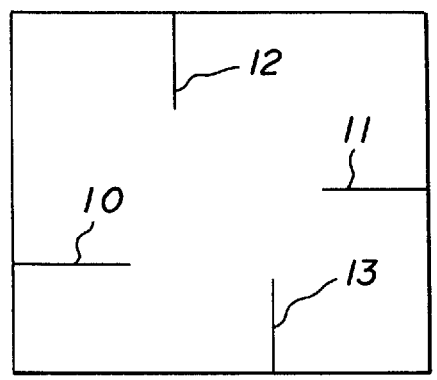
FIG. 1 is a view showing an example of the setter of the present invention having slits.
Figure 2:
FIG. 2 is a view showing another example of the setter of the present invention having slits.
Figure 3:
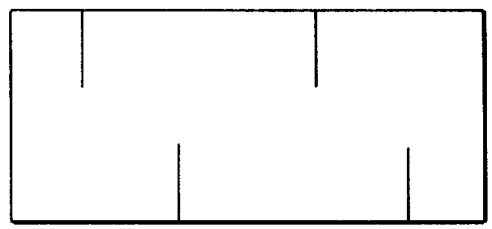
FIG. 3 is a view showing still another example of the setter of the present invention having slits.
Figure 4:
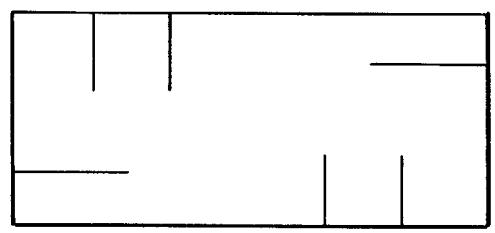
FIG. 4 is a view showing still another example of the setter of the present invention having slits.

There were mixed a SiC fine powder having an average particle diameter of 5.0 $\mu$m and a SiC coarse powder having an average particle diameter of 100 $\mu$m, at a weight ratio of 35:65. 100% by weight of this SiC mixed powder was mixed with 5.0% by weight of a graphite powder having an average particle diameter of 1.5 $\mu$m, 1.0% by weight of an organic binder (methyl cellulose) and 5.0% by weight of water or an organic solvent, whereby a molding material was prepared. The molding material was disintegrated using a ball mill. The disintegrated molding material was introduced into a mold and subjected to press molding at 400 kg/cm² using an oil hydraulic press, to obtain plate-shaped molded materials of 400 mm×350 mm×5 or 10 mm (thickness) having four slits as shown in FIG. 1. Each of the slits 10 and 11 formed parallel to the 400-mm sides of each molded material had a length of 100 mm, and each of the slits 12 and 13 formed parallel to the 350-mm sides had a length of 90 mm.

Each plate-shaped molded material and 50% by weight, based on the molded material, of metallic Si were placed in a carbon crucible having inside a BN (boron nitride) coating as an anti-reaction layer. Firing was conducted in a vacuum of 0.1 Torr from room temperature to 600° C., in an argon gas atmosphere of 2 Torr from 600 to 1,000° C. and in an argon gas atmosphere of 5 Torr from 1,000 to 1,800° C. to produce Si—SiC sintered materials. Incidentally, the retention time at the maximum firing temperature (1,800° C.) was 2 hours. The temperature increase rate from 1,400° to 1,500° C. was 10° C./hr. It is possible to conduct the treatment from room temperature to 600° C. in a gas (e.g. $N_2$ or Ar) of 1 atmosphere and the treatment from 1,000 to 1,800° C. in a high vacuum of about 0.2–0.05 Torr.

The above-obtained Si—SiC sintered materials were measured for bending strength, spalling resistance $\Delta T$ and oxidation resistance $\Delta W$. The results are shown in Table 1.

(Comparative Example 1)

The procedure of Example 1 was repeated except that no slit was formed in plate-shaped molded materials. The results obtained are shown in Table 1.

(Example 2)

There were mixed a SiC fine powder having an average particle diameter of 5.0 $\mu$m and a SiC coarse powder having an average particle diameter of 100 $\mu$m, at a weight ratio of 35:65. 100% by weight of this mixture was mixed with 1.0% by weight of an organic binder (methyl cellulose) and 5.0% by weight of water or an organic solvent, whereby a molding material was prepared. The molding material was molded in the same manner as in Example 1 to obtain plate-shaped molded materials having the same four slits as in Example 1.

Each plate-shaped molded material was fired at 2,300° C. for 3 hours in an argon gas atmosphere to obtain recrystallized SiC sintered materials.

The recrystallized SiC sintered materials were measured for bending strength, spalling resistance $\Delta T$ and oxidation resistance $\Delta W$. The results are shown in Table 1.

(Comparative Example 2)

The procedure of Example 2 was repeated except that no slit was formed in plate-shaped molded materials. The results obtained are shown in Table 1.

(Example 3)

There were mixed 88% by weight of a $Si_3N_4$ powder having an average particle diameter of 0.5 $\mu$m, 7% by weight of yttrium oxide, 2% by weight of zirconium oxide and 3% by weight of magnesium oxide. To 100 parts by weight of this material powder was added 65 parts by weight of water. They were mixed and ground for 5 hours and then molded so as to have the same dimensions as in Example 1. The thus-obtained molded materials were fired in a nitrogen atmosphere at a guage pressure of 0.5 kg/cm² at 1,720° C. for 1 hour to obtain $Si_3N_4$ sintered materials.

It is possible to treat in a gas (e.g. $N_2$ or Ar) of 1 atm. for the temperature range of from room temperature to 600° C. and in a high vacuum of about 0.2–0.05 Torr for the temperature range of 1,000–1,800° C.

The above-obtained $Si_3N_4$ sintered materials were measured for bending strength, spalling resistance $\Delta T$ and oxidation resistance $\Delta W$. The results are shown in Table 1.

(Comparative Example 3)

The procedure of Example 3 was repeated except that no slit was formed in plate-shaped molded materials. The results obtained are shown in Table 1.

TABLE 1

|  |  | Example 1 | Example 2 | Example 3 | Comparative Example 1 | Comparative Example 2 | Comparative Example 3 |
|---|---|---|---|---|---|---|---|
| Bending strength (kgf/cm$^2$) at room temperature and 1,300° C. | | 2,500/2,500 | 950/1,000 | 3,000/1,000 | 2,500/2,500 | 950/1,000 | 3,000/1,000 |
| Spalling resistance ΔT (°C.) | Thickness 10 mm | 650 (small cracks) | 550–575 (small cracks) | 600 (small cracks) | 550 (smashing) | 500 (smashing) | 525 (smashing) |
|  | Thickness 5 mm | 550–600 (small cracks) | Molding was impossible. | Molding was impossible. | 550–525 (smashing) | Molding was impossible. | Molding was impossible. |
| Oxidation resistance ΔW | | ≦0.05% | 1.4% | 1.5% | ≦0.05% | 1.4% | 1.5% |

(Examples 4–7)

Molded materials of 5 mm in thickness having the slit lengths shown in Table 2 were obtained in the same manner as in Example 1. They were fired under the same conditions as in Example 1.

The thus-obtained Si—SiC sintered materials were measured for spalling resistance ΔT and crack length. The results are shown in Table 2.

TABLE 2

|  | Proportion of slit length to side length (%) | Spalling resistance ΔT (°C.) | Slit length (mm) |
|---|---|---|---|
| Example 4 | 15 | 500–525 | 25 |
| Example 5 | 20 | 500–525 | 20 |
| Example 6 | 30 | 500–525 | 15 |
| Example 7 | 40 | 500–525 | 15 |

As it is clear from Tables 1 and 2, the sintered materials having slits, of Examples 1–3, as compared to the sintered materials having no slit, of Comparative Examples 1–3, have large ΔT's and accordingly high spalling resistances.

Whether or not a sintered material (a setter) causes smashing, is important. The reasons are as follows. In a setter having no slit, even when the setter has a small ΔT, the setter causes smashing with a very big noise. The appearance of this phenomenon in a furnace brings about the severe damage of the furnace and, in some cases, makes it necessary to stop the operation of the furnace completely for the repairing of the furnace.

Smashing occurs also at the moment a setter having no slit is taken out from a furnace, owing to the temperature difference (ΔT) between the setter temperature and the atmospheric temperature. In such a case, setters having mounted thereon the materials to be fired, collapse or cause smashing when taken out of a furnace after firing, giving injuries to operators.

(Examples 8–12 and Comparative Examples 4–5)

There were mixed a SiC fine powder having an average particle diameter of 5.0 μm and a coarse SiC powder having an average particle diameter of 100 μm at a weight ratio of 35:65. 100% by weight of the thus-obtained SiC mixed powder was mixed with 5.0% by weight of a graphite powder having an average particle diameter of 1.5 μm, 1.0% by weight of an organic binder (methyl cellulose) and 5.0% by weight of water or an organic solvent to prepare molding materials. At this time, there were used SiC materials containing appropriate amounts of impurities such as Al, Fe, Ti and the like, whereby the amounts of said impurities in the molding materials were controlled at the levels shown in Table 3.

In Table 3, SiO$_2$ contents were controlled by controlling SiO$_2$ contents in Si materials and SiC materials.

Next, each molding material was disintegrated using a ball mill. The disintegrated molding material was introduced into a mold and molded at 400 kg/cm$^2$ using an oil hydraulic press to obtain plate-shaped molded materials of 400 mm×350 mm×5 mm (thickness).

Each plate-shaped molded material and metallic Si (of an amount relative to the SiC mixed powder, shown in Table 3) were placed in a carbon crucible having a BN (boron nitride) coating as an anti-reaction layer inside. They were fired from room temperature to 600° C. in a vacuum of 0.1 Torr, from 600° to 1,000° C. in an argon gas atmosphere of 1 Torr, and from 1,000° to 1,800° C. in an argon atmosphere of 2 Torr, whereby impregnation with metallic Si was conducted and Si—SiC sintered materials containing impurities such as Al and the like in controlled amounts were produced.

As mentioned previously, it is possible to treat in a gas (e.g. N$_2$ or Ar) of 1 atm. for the temperature range of from room temperature to 600° C. and in a high vacuum of about 0.2–0.05 Torr for the temperature range of 1,000°–1,800° C..

The retention time at the highest temperature (1,800° C.) was 2 hours. The temperature increase rate for the temperature range of 1,400–1,500° C. was 10° C./hr.

The above-obtained Si—SiC sintered materials were measured for creep resistance by the test method shown below. The measurement results, compositions, etc. are shown in Table 3.

(Test method for creep resistance)

Figure 5:
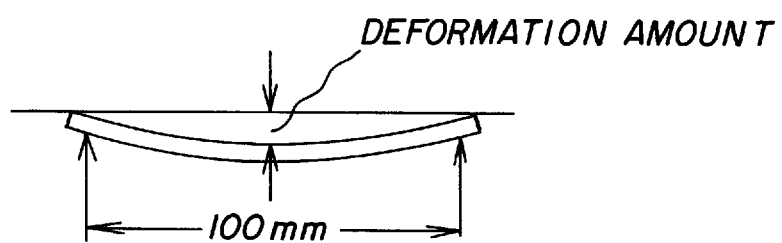
FIG. 5 is a side view showing the creep resistance test used in the present invention.

A test piece of 110 mm×20 mm×5 mm (thickness) was cut out from a Si—SiC sintered material. It was supported at two points (distant by 100 mm from each other) at the bottom side, as shown in FIG. 5. Then, a downward load of 300 kg/cm$^2$ was applied to the test piece at the center in air of 1,350° C. for 100 hours, and the resulting deformation amount was measured.

TABLE 3

| | Si | SiC | Al | Impurities | | | | | | Total | SiO$_2$ | Creep resistance (mm) |
| | | | | Fe | Ti | Ca | Mg | Cr | Ni | | | |
|---|---|---|---|---|---|---|---|---|---|---|---|---|
| Example 8 | 3 | 97 | 0.05 | 0.13 | 0.017 | 0.032 | 0.014 | 0.009 | 0.007 | 0.209 | 0.15 | 0.01 |
| Example 9 | 14 | 86 | 0.01 | 0.35 | 0.02 | 0.091 | 0.005 | 0.037 | 0.02 | 0.523 | 0.74 | 0.005 |
| Example 10 | 20 | 80 | 0.08 | 0.11 | 0.019 | 0.011 | 0.005 | 0.006 | 0.01 | 0.161 | 0.40 | 0.07 |
| Example 11 | 22 | 78 | 0.10 | 0.63 | 0.045 | 0.074 | 0.049 | 0.051 | 0.11 | 0.959 | 1.21 | 0.15 |
| Example 12 | 25 | 75 | 0.20 | 0.018 | 0.007 | 0.005 | 0.006 | 0.006 | 0.008 | 0.05 | 2.50 | 0.20 |
| Comparative Example 4 | 20 | 80 | 0.30 | 0.01 | 0.005 | 0.005 | 0.005 | 0.005 | <0.005 | 0.035 | 1.64 | 1.02 |
| Comparative Example 5 | 25 | 75 | 0.20 | 0.041 | 0.049 | 0.007 | 0.005 | 0.008 | 0.005 | 0.077 | 3.5 | Broken in 58 hours. |

As is clear from Table 3, the Si—SiC sintered materials of the present invention each have an excellent creep resistance.

(Examples 13–21 and Comparative Examples 6–10)

There were mixed a SiC fine powder having an average particle diameter of 3 μm and a SiC coarse powder having an average particle diameter of 100 μm at a weight ratio of 30:70. The mixed SiC powder was mixed with a given amount of a graphite powder having an average particle diameter of 1 μm. 100 parts by weight of the mixture was mixed with 2 parts by weight of an organic binder (methyl cellulose) and 3 parts by weight of water or an organic solvent to obtain molding materials. At this time, there were used SiC materials and C materials, all containing appropriate amounts of impurities (Ca, Al and Fe); in a step described later, there was used metallic Si containing appropriate amounts of impurities; thereby, the amounts of said impurities in the molding materials were controlled at the levels shown in Table 4.

Each of the above-obtained molding materials was disintegrated using a ball mill. The disintegrated molding material was introduced into a mold and molded at 500 kg/cm$^2$ using an oil hydraulic press to obtain plate-shaped molded materials of 400 mm×400 mm×5 mm (thickness).

Each plate-shaped molded material and metallic Si were placed in a carbon crucible having a BN (boron nitride) coating as an anti-reaction layer inside. At this time, metallic Si was used in an excess amount, i.e. a ratio shown in Table 4, to the theoretical amount required for achieving a porosity of 0.8%.

The plate-shaped molded material and the metallic Si were fired from room temperature to 600° C. in a vacuum of 0.1 Torr, from 600° to 1,000° C. in an argon gas atmosphere of 2 Torr, and from 1,000° to 1,800° C. in an argon gas atmosphere of 5 Torr, whereby impregnation with metallic Si was conducted and Si—SiC sintered materials containing controlled amounts of impurities such as Ca and the like were produced.

The retention time at the highest firing temperature (1,800° C.) was 3 hours. The temperature increase rate from 1,400° to 1,500° C. was 10° C./hr.

The Si—SiC sintered materials were measured for oxidation resistance by the following method. The measurement results, porosities, compositions, etc. are shown in Table 4.

(Test method for oxidation resistance)

A test piece of 60 mm×60 mm×5 mm (thickness) was cut out from a Si—SiC sintered material and oxidized in a mixed gas (H$_2$+O$_2$) of 1,150° C., whereby the test piece was measured for the following oxidation rate.

Oxidation rate y=x/1.00×10$^6$/100 (ppm/hr)

Since SiO$_2$-glass film was formed on the surface of the test piece at the early stage of the above oxidation, the weight of the test piece after 100 hours from the oxidation start was taken as 1.00 and the weight of the test piece after 200 hours from the oxidation start was taken as x.

When the oxidation rate y exceeds 50, the oxidation proceeds in a quadratic function even when the sintered material is used in an ordinary atmosphere, inviting the deterioration of the sintered material. Meanwhile, when y is smaller than 50, the oxidation degree becomes lower gradually and such a sintered material can be used at high temperatures for a long period of time.

TABLE 4

| | Metallic Si*$^1$ | Si (wt %) | SiC (wt %) | Bulk density (g/cc) | Porosity (%) | Al*$^2$ | Ca*$^2$ | Fe*$^2$ | Total amount of impurities | Oxidation rate (ppm/hr) |
|---|---|---|---|---|---|---|---|---|---|---|
| Example 13 | 1.15 | 3 | 97 | 3.16 | 0.4 | 0.14 | 0.03 | 0.16 | 0.33 | 26 |
| Example 14 | 1.05 | 5 | 95 | 3.12 | 0.8 | 0.06 | 0.03 | 0.12 | 0.21 | 36 |
| Example 15 | 1.15 | 8 | 92 | 3.11 | 0.2 | 0.37 | 0.07 | 0.36 | 0.8 | 35 |
| Example 16 | 1.15 | 10 | 90 | 3.09 | 0.3 | 0.02 | 0.01 | 0.04 | 0.07 | 13 |
| Example 17 | 1.20 | 12 | 88 | 3.08 | 0.05 | 0.18 | 0.01 | 0.07 | 0.26 | 11 |
| Example 18 | 1.50 | 15 | 85 | 3.05 | 0.04 | 0.03 | 0.01 | 0.07 | 0.11 | 5 |
| Example 19 | 1.15 | 19 | 81 | 3.00 | 0.2 | 0.06 | 0.01 | 0.11 | 0.18 | 14 |
| Example 20 | 1.10 | 25 | 75 | 2.95 | 0.001 | 0.2 | 0.04 | 0.16 | 0.4 | 14 |
| Example 21 | 1.05 | 30 | 70 | 2.88 | 0.8 | 0.23 | 0.1 | 0.25 | 0.58 | 42 |
| Comparative Example 6 | 1.00 | 1 | 99 | 3.16 | 1 | 0.19 | 0.04 | 0.19 | 0.42 | 101 |

TABLE 4-continued

|  | Metallic Si*1 | Si (wt %) | SiC (wt %) | Bulk density (g/cc) | Porosity (%) | Al*2 | Ca*2 | Fe*2 | Total amount of impurities | Oxidation rate (ppm/hr) |
|---|---|---|---|---|---|---|---|---|---|---|
| Comparative Example 7 | 1.10 | 2 | 98 | 3.16 | 0.5 | 0.47 | 0.14 | 0.29 | 0.9 | 60 |
| Comparative Example 8 | 1.00 | 23 | 77 | 2.95 | 0.55 | 0.44 | 0.07 | 0.42 | 0.93 | 55 |
| Comparative Example 9 | 1.03 | 35 | 65 | 2.82 | 0.9 | 0.27 | 0.09 | 0.3 | 0.66 | 111 |
| Comparative Example 10 | 1.00 | 40 | 60 | 2.76 | 1.5 | 0.25 | 0.05 | 0.31 | 0.61 | 150 |

*1Amount when the theoretical amount for achieving a porosity of 0.8% was taken as 1.00.
*2weight part per 100 weight parts of (Si + Sic).

As it is clear from Table 4, the Si—SiC sintered materials (setters) of the present invention have an oxidation rate smaller than 50 ppm/hr and possess an excellent oxidation resistance.

It is also clear that the present process enables production of Si—SiC sintered material (setter) with very high reproducibility.

(Examples 21–25)

Slits were formed in the Si—SiC sintered materials produced in Examples 8–12, in the same manner as in Example 1. The resulting Si—SiC sintered materials were measured for spalling resistance, creep resistance, etc. The results are shown in Table 5. In the measurement of spalling resistance, the thickness of each sintered material was 5 mm.

(Examples 26–31)

Slits were formed in the Si—SiC sintered materials produced in Examples 14–19, in the same manner as in Example 1. The resulting Si—SiC sintered materials were measured for spalling resistance, creep resistance, etc. The results are shown in Table 5.

TABLE 5

|  | Creep resistance (mm) | Oxidation resistance (ppm/hr) | $\Delta T_{400}$ | $\Delta T_{450}$ | $\Delta T_{500}$ | $\Delta T_{550}$ | $\Delta T_{600}$ |
|---|---|---|---|---|---|---|---|
| Example 21 | 0.01 | — | None*1 | None | None | None | 10 mm |
| Example 22 | 0.005 | — | None | None | None | None | 5 mm |
| Example 23 | 0.07 | — | None | None | None | None | 5 mm |
| Example 24 | 0.15 | — | None | None | None | None | 5 mm |
| Example 25 | 0.20 | — | None | None | None | None | 10 mm (one crack) |
| Example 26 | — | 36 | None | None | None | 5 mm*2 | 15 mm (one crack) |
| Example 27 | — | 35 | None | None | None | 5 mm | 10 mm |
| Example 28 | — | 13 | None | None | None | None | 5 mm |
| Example 29 | — | 11 | None | None | None | None | 5 mm |
| Example 30 | — | 5 | None | None | None | None | 5 mm |
| Example 31 | — | 14 | None | None | None | None | 5 mm |

*1No crack
*2Length of crack

As it is clear from Table 5, the setters of the present invention each consisting of a particular Si—SiC sintered material having particular slits, are superior in spalling resistance, creep resistance and oxidation resistance.

Industrial Applicability

As stated above, the first setter of the present invention is made of a material having a bending strength of a given value or higher and has slits of a given length or larger, and resultantly has an excellent spalling resistance. Therefore, the first setter can mount thereon an increased amount of a material to be fired (e.g. ceramic) and gives a higher firing efficiency.

The second setter and the third setter are each made of a Si—SiC sintered material containing controlled amounts of impurities and each have an excellent creep resistance and an excellent oxidation resistance.

Thus, each of the setters of the present invention can be preferably used as kiln furniture (e.g. setter and sagger) for use in a rapid-firing furnace where each kiln furniture is required to have spalling resistance, creep resistance and oxidation resistance, particularly as a setter for use in the firing of tiles in a roller hearth kiln.

We claim:

1. A rectangular spalling-resistant refractory setter for use in a heating furnace, comprising an Si—SiC sintered material containing, as a main phase, 2–25% by weight of Si and 75–98% by weight of SiC, and an Al impurity in a controlled amount of 0.1 to 0.2 part by weight per 100 parts by weight of said main phase, said material having a bending strength of 1,000 kgf/cm$^2$ or higher at 1,000°–1,300° C. and having at least one slit extending from each of at least one pair of the two pairs of parallel sides of the setter toward the opposite side, the length of each slit being 15–35% of the length of each setter side which is parallel to the slit.

2. A spalling-resistant setter according to claim 1, wherein at least one impurity selected from the group consisting of Fe, Ti, Ca, Mg, Cr and Ni is contained in an amount of 0.05–1 part by weight per 100 parts by weight of the main phase.

3. A spalling-resistant setter according to claim 1, wherein the slit(s) extending from one setter side and the slit(s) extending from the opposite side are in a point symmetry.

4. A spalling-resistant setter, comprising a Si—SiC sintered material in the form of a setter, wherein the Si—SiC sintered material contains, as a main phase, 3–30% by weight of Si and 70–97% by weight of SiC, has a controlled porosity of 0.8% or lower, and contains at least one impurity selected from the group consisting of Ca, Al and Fe in a controlled amount of 0.8 part by weight or less per 100 parts by weight of said main phase.

5. A creep-resistant Si—SiC setter comprising, as a main phase, 2–25% by weight of Si and 75–98% by weight of SiC, and an Al impurity in a controlled amount of 0.01 to 0.2 part by weight per 100 parts by weight of said main phase.

6. A creep-resistant setter according to claim 5, further containing at least one impurity selected from the group consisting of Fe, Ti, Ca, Mg, Cr and Ni in an amount of 0.05–1 part by weight per 100 parts by weight of the main phase.

7. An oxidation-resistant Si—SiC setter comprising an Si—SiC sintered material containing, as a main phase, 3–30% by weight of Si and 70–97% by weight of SiC, having a controlled porosity of 0.8% or lower, and containing at least one impurity selected from the group consisting of Ca, Al and Fe in a controlled amount of 0.8 part by weight or less per 100 parts by weight of the main phase.

8. A process for producing a Si—SiC setter using a C powder, a SiC powder and metallic Si, which process is characterized by:

mixing 1–12% by weight of a C powder and 88–99% by weight of a SiC powder, adding a binder to the above-obtained mixture in an amount of 0.1–15 parts by weight per 100 parts by weight of the mixture to obtain a molding material, molding the molding material to obtain a molded material in the form of a setter, and firing the molded material in a metallic Si atmosphere of 1,450°–2,500° C. and a reduced pressure to add metallic Si to the molded material in an amount of at least 1.05 times the theoretical amount capable of giving a sintered material having a porosity of 0.8% or lower, to obtain a Si—SiC sintered material having a porosity of 0.8% or lower, wherein a total amount of at least one impurity selected from the group consisting of Ca, Al and Fe contained in the C powder, the SiC powder and the metallic SiC is 0.8 part by weight or less per 100 parts by weight of a main phase of Si and SiC of the sintered material.

* * * * *